United States Patent [19]

Jimmerson

[11] Patent Number: 5,010,978
[45] Date of Patent: Apr. 30, 1991

[54] APPARATUS AND METHOD FOR A SAWING STAND

[76] Inventor: Scott A. Jimmerson, 2591 N. Shore Rd., Bellingham, Wash. 98226

[21] Appl. No.: 501,262

[22] Filed: Mar. 29, 1990

[51] Int. Cl.$^5$ .......................... B27B 21/00; B25H 1/06
[52] U.S. Cl. ..................................... 182/153; 182/152; 182/225
[58] Field of Search ......................... 182/153, 181–186, 182/225, 152

[56] References Cited

U.S. PATENT DOCUMENTS

| | | | |
|---|---|---|---|
| 293,847 | 2/1884 | Bremer | 182/153 |
| 386,218 | 7/1888 | Phillips | 182/153 |
| 3,207,260 | 9/1965 | Castagna | 182/152 |
| 4,031,981 | 6/1977 | Spencer | 182/153 |
| 4,609,071 | 9/1986 | Edward | 182/152 |
| 4,688,658 | 8/1987 | Stoner | 182/153 |
| 4,819,762 | 4/1989 | Osborne | 182/153 |

Primary Examiner—Reinaldo P. Machado
Attorney, Agent, or Firm—Hughes & Multer

[57] ABSTRACT

A method adapted to support a workpiece to be sawed, and a board supporting assembly which is used with the method. The assembly comprises: a front board supporting means for supporting a front board means, a rear board supporting means for supporting a rear board means, and a connecting board supporting means which is adapted to support a rear board means and which is connected pivotally at a front end thereof to the front board supporting means and at a rear end thereof to said rear board supporting means in a manner that the board supporting assembly reduces in size in a collapsed position and has certain dimensional relationships. The method comprises: providing the assembly; positioning the assembly in an operating position with the board means atop the board supporting means, with the board supporting assembly positioning upper portions of front, intermediate, and rear board means within a workpiece supporting plane; positioning the workpiece supporting assembly in a manner that a longitudinal displacement component exceeds 55% of the length of the workpiece; and positioning the workpiece upon the workpiece supporting plane for sawing, whereby the front and rear portions of the sawed workpiece remain supported.

21 Claims, 4 Drawing Sheets

APPARATUS AND METHOD FOR A SAWING STAND

BACKGROUND OF THE INVENTION

1. Field of the Invention

The present invention relates generally to a sawing stand which uses an improved method of positioning and supporting boards upon which the wood to be sawed is placed.

2. Background Art

Sawhorses are well known which comprise a horizontally disposed member which is supported by legs. Typically two sawhorses are positioned with the horizontal members of the sawhorses being parallel, and then a board, such as a four by eight foot sheet of plywood, is placed for sawing on a top surface of the sawhorses. Desirably for good sawing, a rotary saw blade of the usual type of handheld rotary saw projects a few centimeters below a lower surface of the plywood. Sometimes care must be taken to avoid passing the saw over the sawhorses themselves so that the blade will not cut the sawhorses. Also, once the cut of the plywood is begun, the plywood will sometimes tend to fall between the sawhorses if there is no assistance by an auxiliary support, such as a prop or a person holding the plywood.

A search of the U.S. Patent literature has developed the following patents:

U.S. Pat. No. 1,954,402 (Culp) shows a foldable frame comprising several rectangular frame sections which are connected end-to-end and which are foldable along hinges at the locations where the frame sections are interconnected. The structure, which is used as a portable frame for a screen, folds for flat storage and opens up into a zig zag shaped standing frame.

U.S. Pat. No. 2,042,110 (Leckey) shows a plasterer's mortarboard stand which comprises rods that are pivotally joined together to make a rectangular prismatic structure capable of being folded for flat storage.

U.S. Pat. No. 3,817,191 (Hansen et al) and U.S. Pat. No. 3,162,149 (Hansen) both show variations of a support structure for a multi-positioned table which uses fold-out leg gates. The table, which people sit at, may be swung open or closed.

U.S. Pat. No. 1,588,760 (Lewis) shows another support structure for a folding table which comprises a framework of parallel members joined by folding side members.

U.S. Pat. No. 526,135 (Stone) shows a plurality of upstanding poles which are pivotally interconnected.

U.S. Pat. No. 443,469 (White) shows a support platform which is used for a casket and which has a lazy tong arrangement.

SUMMARY OF THE INVENTION

The board supporting assembly of the present invention is designed to support a plurality of board means so that a workpiece may be placed upon the board means and sawed. The assembly comprises front, rear and connecting board supporting means which are adapted to support front, rear and intermediate board means, respectively. The connecting board supporting means is connected pivotally at front and rear ends thereof to the front and rear board supporting means, respectively, in a manner that the front and rear board supporting means are able to be folded about front and rear privot axes to a collapsed position.

Each of the board supporting means comprises a board support portion, defining a horizontally extending line, a board securing means adapted to secure a lower portion of a related one of the board means at the horizontal line, and a base means adapted to engage a ground surface. The assembly is adapted to position a top portion of each of the front, rear, and intermediate board means within a board supporting plane. The connecting board supporting means is at least about 4¾ feet in length. This enables the front and rear board supporting means to be displaced by a longitudinal displacement from one another of 4½ feet along a lengthwise axis of the assembly. A sheet of four foot by eight foot material is able to be placed upon the board supporting plane and is able to be sawed and remain supported by the board means.

In a preferred embodiment, the assembly defines a Z shape, with the front and rear board supporting means extending substantially to first and second opposed sides of the connecting board supporting means.

In the preferred form, each of the board supporting means further comprises a means for securing the related board means thereto in a manner to leave an upper portion of said board means unobstructed. A saw is able to cut with a safe clearance through an upper portion of the board means at various locations. Also, the board means can be sawed into and still remain rigidly disposed.

The method of the present invention of supporting the workpiece to be sawed comprises several steps. First there are provided the board supporting assembly, as just described, and the board means. Next the board supporting assembly is positioned in an operating position, wherein the front, rear, and connecting board supporting means each supports its related front, rear, and intermediate board means along a length of the front, rear, and connecting board supporting means, respectively. The board supporting assembly in its operating position is adapted to position top surfaces of the front, intermediate, and rear board means substantially within the workpiece supporting plane. (Again, the connecting board supporting means has sufficient length to enable the displacement component (along the lengthwise axis of the assembly between the front board means and the rear board means, to exceed 55% of the length of the workpiece.) Finally, the workpiece is positioned upon the workpiece supporting plane, whereby the workpiece is able to be cut and the front and rear portions are able to remain supported.

DESCRIPTION OF THE PREFERRED EMBODIMENT

Figure 1:
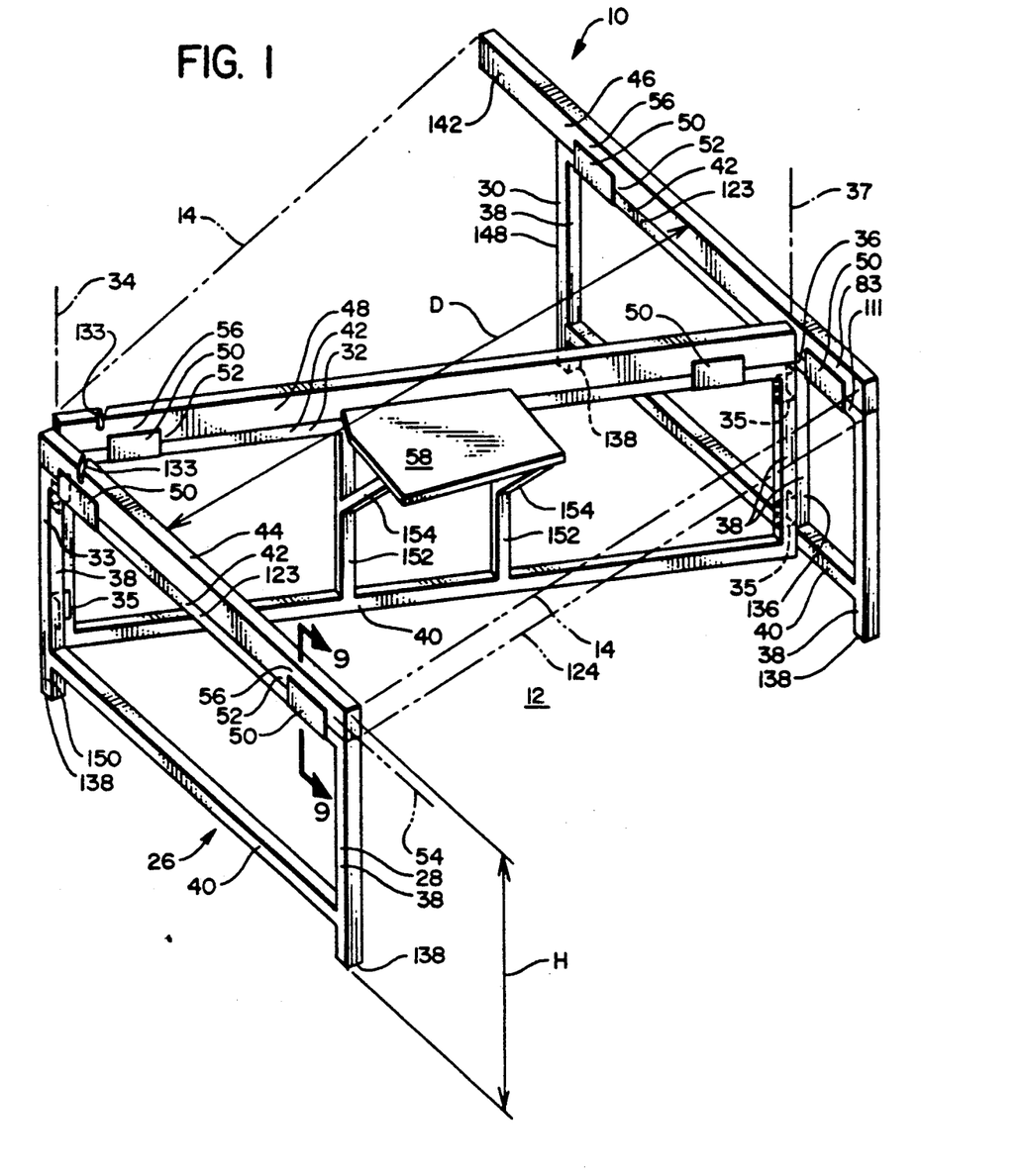
FIG. 1 is a perspective view from the front of the sawing stand of the present invention in its operating position and with a detachable shelf of the present invention in place.

A sawing stand 10, as shown in FIG. 1, is set up upon the ground surface 12 at a work site. On a workpiece support area 14 of the sawing stand 10 various sizes and shapes of wood, such as a four foot by eight foot sheet 16 of plywood (shown in FIG. 2), are laid and then sawed. The saw which is used may be of a handheld rotary power type (not shown) or of a mountable type 24 (pictured in FIG. 6) which is mounted detachably onto the sawing stand 10 in a manner which is described below.

For purposes of orientation, the terms "front", "forward", or "forwardly", will denote a direction toward, or a proximity to, a forward end 26 of the sawing stand 10 pictured in FIG. 1, while the terms "rear", "rearward", or "rearwardly", will denote the opposite.

Referring to the perspective view of FIG. 1, the sawing stand 10 comprises a front section 28 and a rear section 30, with a forward end of a connecting section 32 being joined to a left end portion 33 of the front section 28 at a front vertical hinge axis 34 by hinges 35, and with a rear end of the connecting section 32 being joined to a right end portion 36 of the rear section 30 at a rear vertical hinge axis 37 by the hinges 35. (The hinges 35 are indicated by dashed lines). Each of the sections 28, 30, and 32, comprises a plurality of vertical posts 38 which are fixedly connected at the bottom to a bottom cross member 40 and at the upper end to an upper cross member 42 to make a rigid rectangular frame, so that when the sections 28, 30, and 32, are connected hingedly as described, the sawing stand 10 stands up rigidly. There are three boards or rails of two by four lumber (that is lumber which is sold after being seasoned as two inch by four inch nominal size, and which is actually typically about one and five eighth inches by three and one half inches) with the three rails comprising a front rail 44, which aligns with, and lies on top of, the front section 28, a rear rail 46, which aligns with, and lies on top of, the rear section 30, and a connecting rail 48, which aligns with, and lies on top of, the connecting section 32. The sections 28, 30, and 32 position the top surface of the rails 44, 46, and 48 in the same horizontal plane, so that the rails 44, 46, and 48 define the work piece support area 14 of the sawing stand 10.

The front rail 44 and the connecting rail 48 are able to rotate with respect to one another about the front hinge axis 34, and the rear rail 46 and the connecting rail 48 are able to rotate with respect to one another about the rear hinge axis 37.

Figure 9:
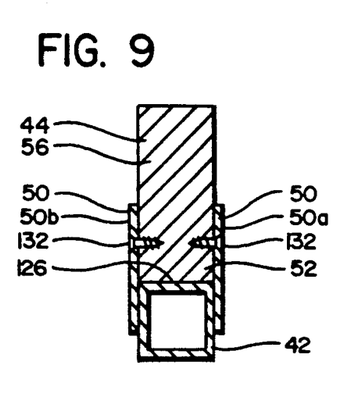
FIG. 9 is a cross-section taken along a line 9—9 in FIG. 1 of the wooden rail member and the rail support member of the present invention.

There are a plurality of connecting plates 50, which are positioned in pairs of plates 50a and 50b as shown in the cross sectional view of FIG. 9 and which, by being securely fastened both to the upper cross members 42 and to a lower portion 52 of the rails 44, 46, and 48, secure each of the rails 44, 46, and 48 in its horizontal position and adjacent to its related cross member 42. The plates 50 only extend upwardly to an upper vertical limit, which is indicated in FIG. 1 by the horizontal line 54, so that an upper portion 56 of each of the rails 44, 46, and 48 is completely unobstructed.

There is a shelf 58 which is detachably connected on the side of the connecting section 32, so as to extend horizontally outwardly therefrom, and upon which the mountable saw 24 may be detachably mounted. The level of the shelf 58 in relation to the top of the rails 44-48 is such that when the mountable saw 24 (shown in FIG. 6) is mounted on the shelf 58, a cutting table 59 of the mountable saw 24, upon which the wood to be sawed is placed, is at the same level as the tops of the rails 44-48. If the sawing stand 10 is to be used to saw sheets 16 of plywood, then the mountable saw 24 is removed from the shelf 58, so that the sheet 16, or other relatively large piece of lumber, may be laid upon the top of the rails 44-48 without interference.

When the sawing stand 10 is in an operating position, as shown in FIG. 1, and when a person is sawing workpieces of significant bulk, such as the eight foot long sheet 16 of plywood, the front rail 44 and the rear rail 46 should be displaced from one another longitudinally by a displacement which is minimally sixty percent, and preferably at least seventy percent, of a length of the workpiece, and which is indicated by a double-ended arrow D. Thus, in the case of the sheet 16, the rails 44 and 46 should be displaced from one another longitudinally by at least seventy percent of ninety-six inches, that is, by about at least sixty-seven inches.

Figure 2:
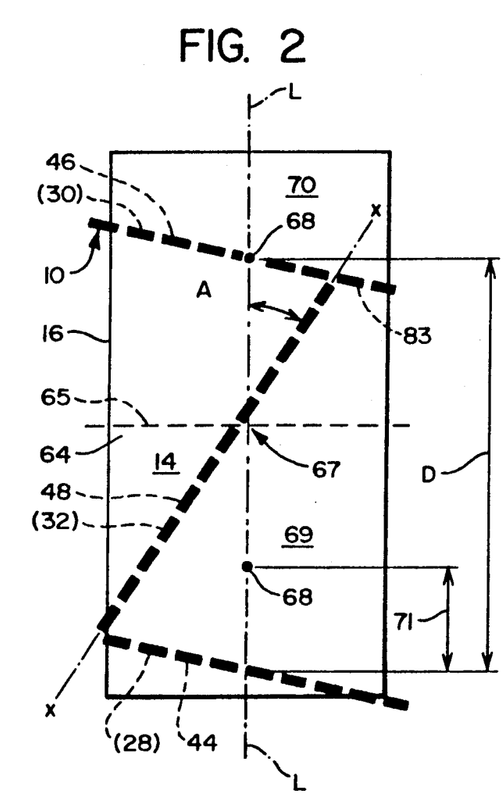
FIG. 2 is a top view looking down through a sheet of four foot by eight foot plywood being supported by the sawing stand in its operating position.

As the top view of the sawing stand 10 in its operating position of FIG. 2, illustrates, in many instances where the workpiece, which in this case is the sheet 16, has a substantial width, it is desirable that a lengthwise axis 1—1 of the workpiece be in general alignment (looking downwardly, as in FIG. 2) with a longitudinal axis L—L of the workpiece support area 14. The longitudinal axis L—L is an imaginary line through midpoints of the front rail 44 and of the rear rail 46. The top view of FIG. 11, unlike in FIG. 2 where the front and rear rails 44 and 46 are each positioned at acute angles to the connecting rail 48, shows an instance where the rails 44 and 46 are each positioned about at right angles to the connecting rail 48. Even in the position pictured in FIG. 11, it is desirable that the lengthwise axis 1—1 of the sheet 16 be generally aligned with the longitudinal axis L—L.

Figures 3, 4, 5, 6:
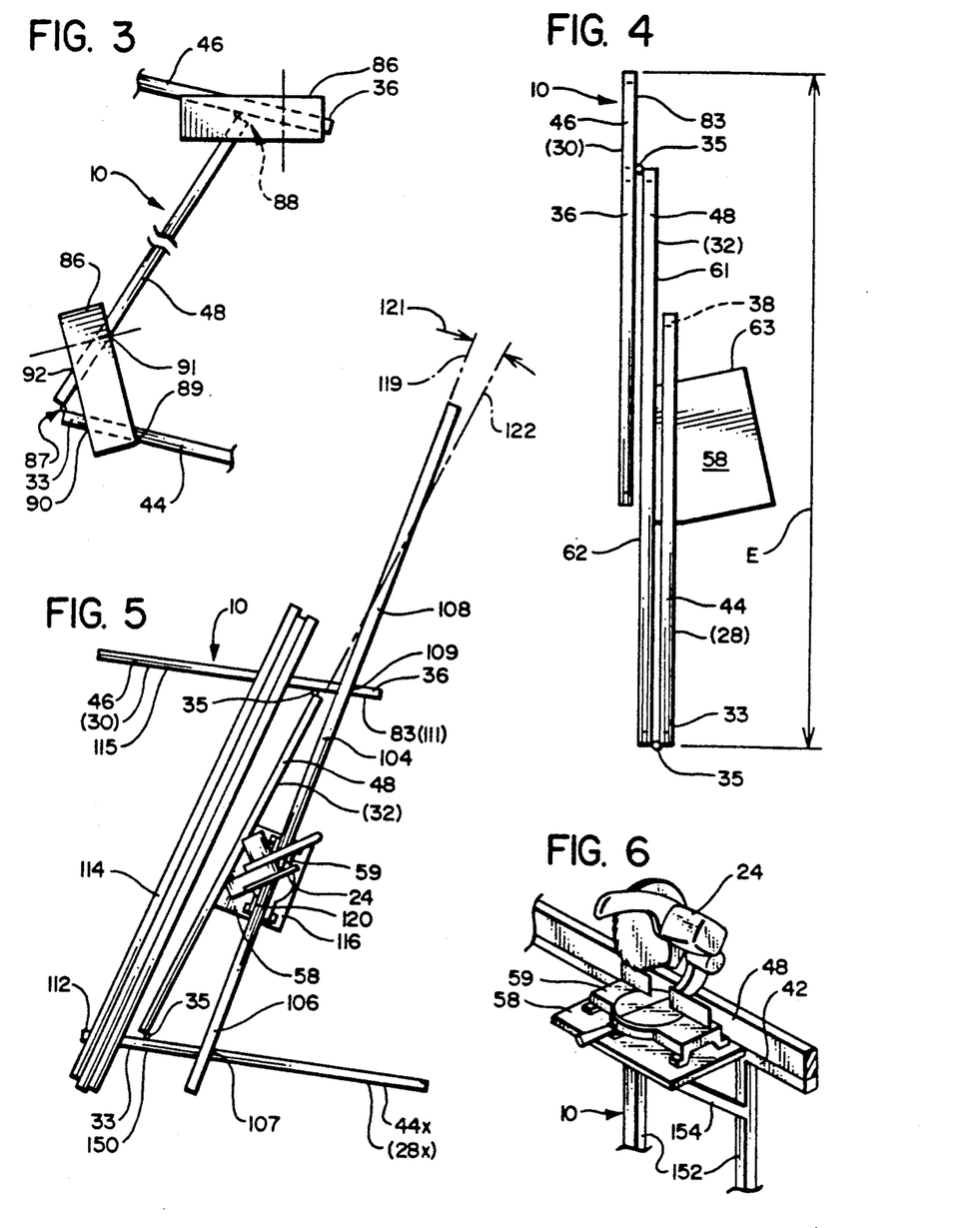
FIG. 3 is a top fragmentary view of a forward and a rear joint location of the sawing stand upon which small boards are positioned to be sawed.
FIG. 4 is a top view with the sawing stand folded into its collapsed position for storage.
FIG. 5 is a top view of the sawing stand being used to make a mitre cut of a long thin board, a rotary power saw having been mounted on the detachable shelf and a left extension having been added to a front portion of the sawing stand.
FIG. 6 is a perspective view of the rotary saw as mounted on the shelf of the present invention.

As shown in the top view of FIG. 4, the front rail 44 is able to close inwardly to a right side 61 of the connecting rail 48, and the rear rail 46 is able to close inwardly to a left side 62 of the connecting rail 48, whereby the sawing stand 10 may be collapsed into its collapsed position. In the collapsed position of FIG. 4, the front section 28 (which, as indicated by the parenthesis around the reference number 28, is beneath the front rail 44) and the rear section 30 (which is beneath the rear rail 46) are both aligned parallel to the connecting section 32 (which is beneath the connecting rail 48) and all or a majority of a length of the front rail 44 overlaps with a length of the connecting rail 48 (and of the connecting section 32), and a majority of a length of the rear rail 46 overlaps with the length of the connecting rail 48. It is desirable that the overall length, which is indicated by the double arrow E, of the sawing stand 10 in its collapsed position be about the length of the carrying area within a vehicle, such as a pickup truck. Thus in many cases, so that the sawing stand 10 fits within the carrying area of the pickup truck, a preferable total length of the sawing stand 10 in its collapsed position is about eight feet and accordingly the length of the connecting section 32 (which determines the length of the sawing stand 10) should in these cases be shorter than about eight feet. While the connecting section 32 should be sufficiently long to provide the longitudinal displacement D between the rails 44 and 46, it should be sufficiently short to avoid making the sawing stand 10 too long overall. The range of lengths of the connecting section 32 is an important feature of the invention, and this subject is taken up again further on below.

It is also to be noted that the front section 28 should have a sufficient length in relation to a rearward end location 63 of the shelf 58, so that in the process of rotating the front section 28 to its collapsed position, a rightmost one of the vertical posts 38 of the section 28 may pass around the shelf 58 with the shelf 58 mounted in place. In FIG. 4 the front section 28 is illustrated as having a length of about 70% of the length of the connecting section 32.

Let it be assumed now that the sheet 16 of four foot by eight foot plywood, as shown in the top view of FIG. 2 is to be cross cut through a middle area 64, as indicated by dashed line 65 through the area 64 of the sheet 16. As mentioned, the sawing stand which is indicated by the thick dark dashed line 10 is positioned in its operating position. The sheet 16 is laid on top of the sawing stand 10 so as to cover the rails 44, 46 and 48, and then is sawed completely through using the hand-held rotary saw. Since desirably for good sawing the saw blade will project below the sheet 16, the saw blade, as it travels across the workpiece along the path of the dashed line 65, will need to pass through the rail 48 at 67. The saw blade is able to do this because, as mentioned earlier, at various places the upper portions 56 of the rails 44, 46, and 48 are unobstructed wood. Yet the rail 48 is able to be positioned beneath the middle area 64 of the sheet 16 for firm support. The front rail 44 and the rear rail 46 are displaced from one another longitudinally by the preferred amount of the longitudinal displacement (indicated by the double-headed dashed arrow D) which as mentioned is at least about 70% of the workpiece length. Because of this longitudinal dimension, centers of gravity, which are indicated by two dots 68, of a forward half portion 69 and of a rearward half portion 70 of the sheet 16 will remain inside the workpiece support area 14, which as mentioned is defined by the front rail 44, and the rear rail 46. This will eliminate the tendency of the forward half portion 69 and the rearward half portion 70 to fall during sawing. This will also give the person using the sawing stand 10 some grace area, which is indicated by the double-headed arrow 71, so that the sheet 16 may be moved rearwardly or forwardly by twenty percent of its length, (that is, the seventy percent of the workpiece length, which is encompassed by the workpiece support area 14, minus fifty percent of the workpiece length between the dots 68) while still assuring that the forward half portion 69 and the rearward half portion 70 will be supported and that the centers of gravity of the portions 69 and 70 will still be within the workpiece support area 14.

The connecting rail 48 makes an acute slant angle A with the longitudinal axis L—L of the workpiece support area 14, with the angle A in this illustrated case being about 30° to 35°. Thus it can be seen that the while the connecting rail 48 (and the connecting section 32 beneath the connecting rail 48) have a substantial alignment component with the axis L—L, the connecting rail 48 nonetheless is disposed in the slanted relation with the axis L—L. The slant angle A results from the fact that the forward end of the connecting section 32 is connected to the front section 28 at a fixed distance to the left of the midpoint of the front rail 44, and that the rear end of the connecting section 32 is connected to the rear section 30 at a fixed distance to the right of the midpoint of the rear rail 46, keeping in mind that when the sawing stand 10 is in its operating position the midpoints of the front and rear rails 44 and 46, respectively, are displaced some distance to the right and left, respectively, of an alignment axis x—x of the connecting section 32.

Figures 7, 8:
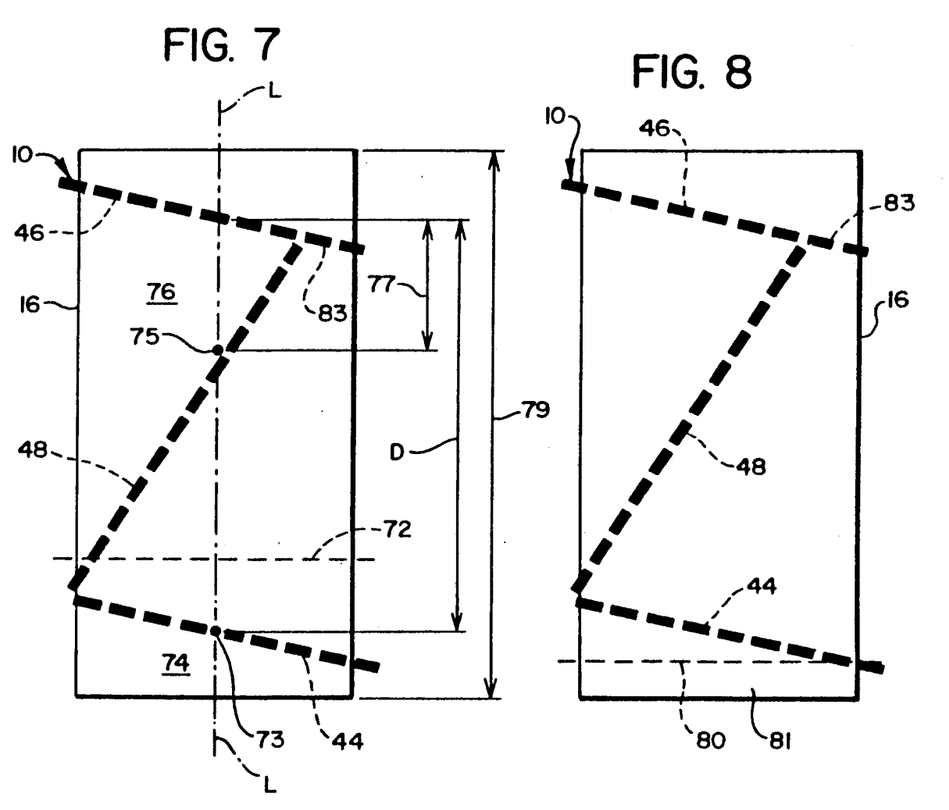
FIG. 7 is a view like FIG. 2 with the plywood positioned so that the plywood may be cross cut near relatively to a forward end thereof.
FIG. 8 is a view like FIG. 7 but with the plywood being positioned so that the plywood is cut at an extreme forward end thereof.

If it is assumed that the sheet 16 is to be cross cut at a location which is relatively toward one end thereof, as indicated by the dashed line 72 in the top view of FIG. 7, then the sheet 16 is positioned on the sawing stand 10 with a center of gravity (indicated by a dot 73) of a smaller first portion 74 of the sheet 16 positioned rearwardly of the front rail 44, and with a center of gravity, indicated by a dot 75, of a larger second portion 76 of the sheet 16 positioned forwardly of the rear rail 46 so that the portions 74 and 76 are each supported after the cut is made. This relationship between the centers of gravity of the portions 74 and 76 and the rails 44 and 46 is still maintained if the sheet 16 is moved rearwardly by the grace distance, with the grace distance being indicated by the double-headed arrow 77. It is to be noted that the grace distance in each of these cases of cross-sawing the workpiece equals the longitudinal displacement, as indicated by the double-headed arrow D in FIG. 7, between the front rail 44 and the rear rail 46, minus the product of a length, which is indicated by the arrow 79 in FIG. 7, of the workpiece times one half.

Assuming that the sheet 16 is to be cross cut at an extreme forward end thereof, as indicated by the dashed line 80 in FIG. 8, then the cut may be made forwardly of the front rail 44 because a falling portion 81 of the sheet 16 is so light that in this particular case there is no harm in just letting the portion 81 fall.

Figure 10:
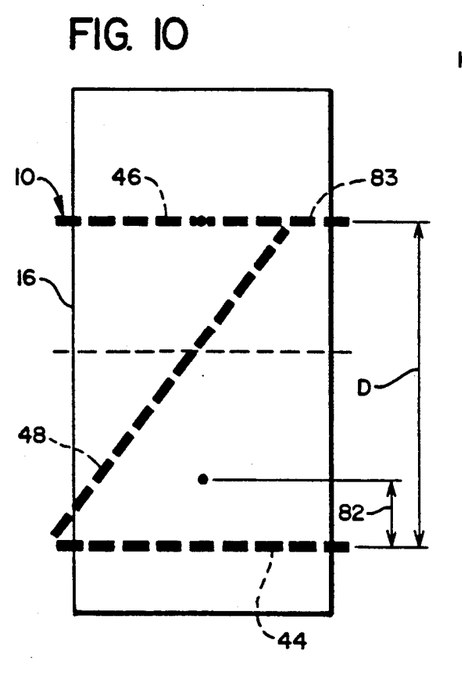
FIG. 10 is a top view like FIG. 2 but with a longitudinal displacement from the front rail to the rear rail of the present invention shortened.

Let it be assumed that the sawing stand 10 is positioned in the operating position and that the eight foot long sheet 16 is being sawed as before, except that as shown in FIG. 10 the positions of the front rail 44 and the rear rail 46 are positioned so that the longitudinal displacement indicated by the arrow D between the front rail 44 and the rear rail 46 is now fifty-eight inches, that is, sixty percent of the workpiece length of ninety-six inches. The grace distance indicated by the arrow 82 is now ten percent of the workpiece length. This smaller grace distance makes sawing the workpiece more difficult, because the workpiece now must be more precisely positioned on the sawing stand 10. If the displacement D were to be shortened to less than sixty percent of the length of the workpiece, then positioning of the sheet 16 would become increasingly difficult. With the displacement D shorter than fifty percent of the length of the workpiece there would be no grace distance left and the cut portions of the workpiece would not be supported by the sawing stand 10. Accordingly, sixty percent of the workpiece length, as shown in FIG. 10, represents the minimum recommended longitudinal displacement D between the rails 44 and 46 for sawing the workpieces of substantial bulk.

As mentioned earlier, the connecting section 32 must have a sufficient length to enable the front and rear rails 44 to be displaced by the recommended amount of the displacement D. In the illustrated cases of FIGS. 2, 7, 8, and 10, of sawing the eight foot long sheets 16 it has been found that the connecting section 32 should preferably have the length of about at least six feet. If the length of the connecting section 32 is between about six feet and eight feet, then the sawing stand 10 will fit within the presumed eight foot long carrying area of a pickup truck, provided, as shown in FIG. 10 and previously described, that the front hinge axis 34 about which the front rail 44 rotates is located near to a left end of the front rail 44 and that the rear hinge axis 37 about which the rear rail 46 rotates is located near to a right end of the rear rail 46 so that the front rail 44 and the rear rail 46 have their substantial overlaps with the connecting section 32 in the collapsed position.

It is sometimes desirable to extend the rear rail 46 to the right of the rear hinge axis 37 so as to provide an extension portion 83. The extension portion 83 adds to the overall length of the sawing stand 10 when it is in its collapsed position (shown in FIG. 4). The length of the extension portion 83 illustrated in FIG. 10 is one foot so as to give an overall length in that case of the sawing stand 10 in its collapsed position of seven feet.

Figure 11:
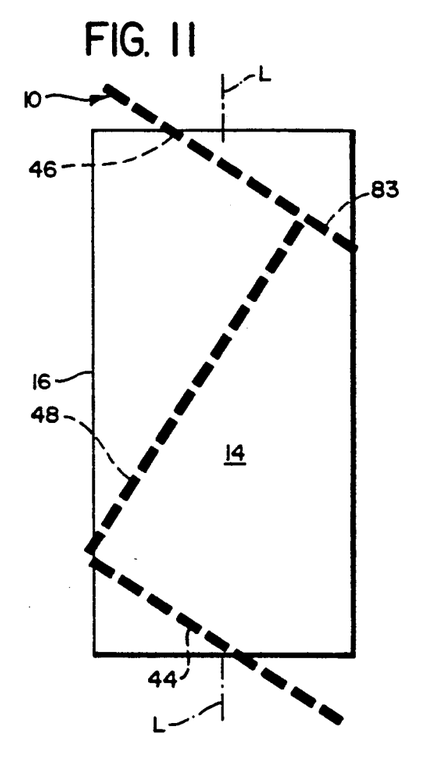
FIG. 11 is a view like FIG. 2 but with the connecting rail of the present invention being positioned perpendicularly to the front rail and the rear rail.

To obtain additional grace area, or for sawing larger size pieces of material, the front rail 44, as shown in FIG. 11, may be swung forwardly so that the front rail 44 and the connecting rail 48 approach defining a right angle and similarly the rear rail 46 may be swung rearwardly so that the rear rail 46 and the connecting rail 48 approach defining a right angle. As previously mentioned, when the sawing stand 10 is in this extreme open position it is still preferable for the lengthwise axis 1—1 of the workpiece to be substantially aligned with the longitudinal axis L—L of the workpiece support area 14.

Let us assume that a short board 86, which may be quite small, perhaps a foot and a half in length, is to be crosscut, as shown in the top fragmented views of FIG. 3. The top surfaces of the front rail 44, and of a forward end of the connecting rail 48 make a front joint location 87 at the front hinge axis 34, and the top surfaces of the rear rail 46 and of a rearward end of the connecting rail 48 make a rear joint location 88 at the rear hinge axis 37. For sawing, the short board 86 is placed atop the front joint location 87 or atop the rear joint location 88. During sawing, the board 86 is firmly supported at the forward joint location 87 by the front rail 44 at 89 and 90 and by the connecting rail 48 at 91 and 92. Similarly, the board 86 is firmly supported at the rear joint location 88.

Most consumer handheld saws have a cutting depth which is shallow enough to assure that the blade of the handheld saw can pass through the rails 44, 46 and 48 without ever striking the plates 50. Hence, during any of these sawing procedures as viewed in FIGS. 2, 3, 7-8, and 10-11, the handheld saw may safely pass over the rails 44, 46, and 48.

Figure 12:
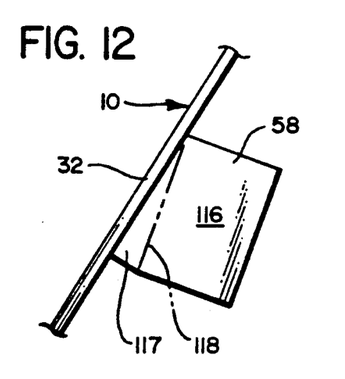
FIG. 12 is a reduced top view of the detachable shelf of the present invention which is shown attached to the sawing stand.

Assuming that a long strip of wood 104 such as a piece of moulding twelve feet long is to be cut by the mounted saw 24, desirably the following procedure is used, as shown in FIG. 5. As mentioned previously, the cutting table 59 of the mounted saw 24 is level with the tops of the rails 44, 46 and 48. A forward part 106 of the long piece 104 is supported at 107 by the front rail 44. A rear part 108 of the long piece 104 is supported at 109 on the extension portion 83 of the rear rail 46. (The portion 83 is in turn supported by a right portion of the rear section 30 which is indicated by the reference number 111 in parenthesis in FIG. 5, and which is also shown in plain view in FIG. 1. As is apparent, the right portion 111 of the rear section 30, as well as the extension portion 83 of the rear rail 46, extend to the right of the rear hinge axis 37). Various modifications may be made to the positions of the sections and the rails, as, for example certain modifications shown here. The front rail 44x in FIG. 5, unlike the front rail 44 in FIGS. 2, 7-8 and 10-11, is modified so as to have an extension portion 112 which extends to the left of the front hinge axis 34. A pile 114 of boards which are waiting to be cut may then be supported upon the extension portion 112 of the front rail 44x and upon a left portion 115 of the rear rail 46 which extends to the left of the rear hinge axis 37. As is shown in the detailed view of FIG. 12, the shelf 58 used with the mountable saw 24 comprises a rectangle 116 and a triangle 117 having a common side 118. Returning to FIG. 5, the rectangle 116 is about the size of the base of the mountable saw 24, so that when the mountable saw 24 is positioned so as to be square with the rectangle 116, an imaginary extension line 119 of a sawing fence 120 of the mountable saw 24 makes an angle 121 with an imaginary extension line 122 of the connecting rail 48. The angle 121 enables the extension portion 83 of the rear rail 46 to be used to support the long piece 104 with the extension portion 83 being shorter than otherwise possible.

As is apparent, the extension portion 112 of the front rail 44, like the extension portion 83 of the rear rail 46 and the extension portion 111 of the rear section 30, adds to the overall length of the sawing stand 10 in its collapsed position. In certain instances to reduce the overall length, as for example as already mentioned for storage of the sawing stand in certain pickup trucks, the extension portions 83 and 111 as well as the extension portion 112 of the front rail 44x are best omitted from the sawing stand 10. If the extension portions 83 and 111 are omitted, then the angle 121 should be increased so that the long piece 104 may then be supported on the connecting rail 48 and on the left portion 115 of the rear rail 46. If the extension portion 112 is omitted, then the pile 114 may be supported upon the rear rail 46 at one end, and on the connecting rail 48 and on the front rail 44 at the other end.

The rails 44, 46 and 48 are positioned at a height indicated by the arrow H, as shown in FIG. 1, which is convenient for a person who is standing, and which is generally in a range of between about 24 inches and 48 inches and more desirably between about thirty and thirty-six inches, above the ground 12.

In summary, the top surfaces of the rails 44, 46 and 48, define the workpiece support area 14. The sections 28, 30, and 32 constitute a rail supporting assembly 123, with the upper cross members 42 constituting support sections which define a horizontally extending rail support plane 124, so that the lower portion 52 of each of the rails 44, 46 and 48 is secured at the horizontal support plane 124. In this manner, the rails may be sawed into by the handheld saw at various places and still remain rigidly disposed. The posts 38 provide ground surface engagement so that the sections 28, 30, and 32, may support and position the rails 44, 46, and 48 at the described height and so as to make the rail support plane 124 horizontal to the ground 12. It is to be noted that the ground 12 is any surface upon which a person who is using the sawing table 10 stands.

The sawing table 10 solves various sawing problems. Where previously it was difficult to saw the short board 86 safely without the use of clamps or jigs, the joint locations 87 and 88 provide convenient locations for such cutting. Inasmuch as the short board 86 is in contact with the sawing stand 10 at the several points 89, 90, 91, and 92, slippage is minimized. The plywood sheet 16 may be cut without the portions 69, 70, 74, and 76 falling. When the centers of gravity at the dots 68 and 73 are within the workpiece support area 14, the connecting rail 48 stabilizes the portions 69, 70, 74 and 76. The described outward rotation of the front rail 44 and the rear rail 46 in FIG. 11 enlarges the workpiece supporting area 14 so as to provide an even larger range of positions in which the sheet 16 maybe safely sawed.

Having described the major features of the present invention, further details will now be provided.

To provide details concerning the rails 44, 46 and 48 as shown in the cross-section of FIG. 9 (taken along the line 9—9 of FIG. 1), the unobstructed, upper wood portion 56 is preferably at least one and one half inches deep because one and one half inches is in most instances the maximum saw blade depth of standard consumer handheld rotary saws. As mentioned earlier, the wooden two by fours of which the rails 44, 46, and 48 are made typically have an actual width which is about one and five eighths inches. Hence, the tops of the upper cross members 42 are one and five eighth inches wide, as is a rail channel 126, which is defined by the two opposing plates 50a and 50b, with the plates 50a and 50b comprising the outer plate 50b and the inner plate 50a and with these plates 50a and 50b making the plurality of pairs that hold the rails at various places. The front section 28, the rear section 30, and the connecting section 32, respectively, each uses two of the pairs of plates 50a and 50b to secure the front rail 44, the rear rail 46, and the connecting rail 48, respectively, in place. The plates 50a and 50b are welded to the sides of the upper cross members 42 and are fastened by screws 132 to the rails 44, 46, and 48. If certain sections of the rails 44, 46, or 48, become weak because of excessive through-sawing, for example as may happen at the joint locations 87 and 88 (with through-sawing being indicated by the notches 133), the weakened rail 44, 46, or 48 may be readily replaced by removing the screws 132.

In lieu of the pairs of plates 50a-50b, single plates 50 may be Used on one side of the rails 44-48. For example, single plates 50 may be used at rightward and leftward ends of the front rail 44. This permits varying widths to be used with the rail supporting assembly 123.

To permit compact folding of the sawing stand 10 as shown in FIG. 4, the posts 38 and the cross members 40 and 42 (which are beneath the rails 44, 46 and 48 and are hidden from view) of the support assembly 27 have a width which is equal to the width of the rails 44, 46, and 48.

As shown in FIG. 1, a middle post 136 of the rear section 30 extends only as low as the bottom cross members 40 and does not touch the ground 12. Thus, the sawing stand 10 engages the ground at four points 138.

A left end portion 142 of the rear rail 46 (shown in FIG. 1), and the extension portion 112 of the front rail 44 (shown in FIG. 5) respectively, extend horizontally beyond a left end 148 of the rear section 30, and a left end 150 of the front section 28.

As shown in FIG. 1, to firmly support the shelf 58 on the connecting section 32, the shelf 58 is detachably mounted to vertical posts 152 and brackets 154, with the posts 152 in turn being fixedly mounted to the upper cross member 42 and to the bottom cross member 40.

It is to be understood that the foregoing may be modified without departing from the basic teachings of the present invention.

What is claimed is:

1. A board supporting assembly for supporting a plurality of board means so that a workpiece may be placed upon the board means and sawed thereon, said assembly having a longitudinal axis and a transverse axis, said assembly comprising:
   a. a front board supporting means adapted to support a front board means at a front end of said assembly;
   b. a rear board supporting means adapted to support a rear board means at a rear end of said assembly;
   c. a connecting board supporting means adapted to support an intermediate board means and connected pivotally at a front end thereof to said front board supporting means in a manner that said front board supporting means is able to be rotated about a front pivot axis to a collapsed position, and with said connecting board supporting means being connected pivotally at a rear end thereof to said rear board supporting means in a manner that said rear board supporting means may be rotated about a rear pivot axis to a collapsed position
   d. each of said front, rear, and connecting board supporting means comprising:
      i. a board support portion defining a horizontally extending line;
      ii. a board securing means for securing a lower portion of a related one of said front, rear, and intermediate board means at said horizontal line; and
      iii. a base means for ground surface engagement, said assembly being adapted to position a top portion of said board means within a workpiece supporting plane, a length of said connecting board supporting means being at least about 4¾ feet, whereby said board means is able to be positioned upon said board supporting means, a sheet of four foot by eight foot material is able to be placed upon top surfaces of said board means, and a longitudinal displacement component along said longitudinal axis from said front board means to said rear board means is able to be at least 4½ feet so that said sheet of material is able to remain supported by said board means while being sawed.

2. The board supporting assembly as recited in claim 1, wherein in a normal operating position said board supporting assembly is adapted to define a Z shape, said front and rear board supporting means, respectively, extending substantially to first and second opposed sides, respectively, of said connecting board supporting means.

3. The board supporting assebly as recited in claim 1, wherein an overall length of said board supporting assembly in its collapsed position is less than about ten feet.

4. The board supporting assebly as recited in claim 3, wherein said connecting board supporting means comprises means for detachably attaching to said connecting board supporting means, a platform means which attaches so as to extend horizontally from a first side of said connecting board supporting means.

5. The board supporting assembly as recited in claim 1, wherein said board securing means is adapted to extend vertically from said horizontally extending line for only a portion of a thickness of said board means in a manner to leave an upper portion of said board means unobstructed so that a saw is able to cut with safe clearance through an upper portion of said board means at various locations.

6. The board supporting assembly as recited in claim 5, wherein said board securing means comprises:
 a. a horizontal member defining said horizontally extending line and having first and second substantially parallel sides;
 b. fixedly mounted on each of first and second sides, one or more vertically extending plate means which define sides of a slot means, said horizontal member defining a bottom of said slot means, said slot means being adapted to hold said board means.

7. The board supporting assembly as recited in claim 5, wherein in a normal operating position, said board supporting assembly defines a Z shape, said front and rear board supporting means extending substantially to third and fourth opposed sides of said connecting board supporting means.

8. The board supporting assembly as recited in claim 5, wherein said connecting board supporting means comprises means for detachably attaching to said connecting board supporting means, a platform means which attachs so as to extend horizontally from a first side of said connecting board supporting means.

9. The board supporting assembly as recited in claim 8, further comprising means for allowing a rear board means to extend from said rear pivot axis horizontally to said first side of said connecting board supporting means; wherein, said platform means comprises a rectangular platform portion which, when said platform means is attached to said connecting board supporting means, is positioned so that a lengthwise axis of said rectangular platform portion and said length of said connecting board supporting means define an angle which is zero to forty degrees.

10. The board supporting assembly as recited in claim 1, wherein said board supporting assembly is adapted to position a front end of said intermediate board means within six inches of said front board means, whereby, said intermediate board means and said front board means define a board joint location adapted to support short workpieces while they are being sawed.

11. A workpiece supporting assembly adapted to support a workpiece for sawing, comprising:
 a. a front workpiece supporting frame means at a front end of said assembly;
 b. a rear workpiece supporting frame means at a rear end of said assembly;
 c. a connecting workpiece supporting frame means connected pivotally at front and rear ends, respectively, thereof to said front and rear workpiece supporting frame means, respectively, in a manner that said front and rear workpiece support frame means, respectively, are able to be rotated about front and rear pivot axes, respectively, to a collapsed position;
 d. each of said front, rear, and connecting workpiece supporting frame means comprising:
  i. a board supporting portion defining a horizontally extending line;
  ii. a board securing means for securing a lower portion of a related one of front, rear, and intermediate board means at said horizontal line;
  iii. a related one of said front, rear, and intermediate board means, which is attached to said board securing means;
  iv. a base means adapted to engage a ground surface, said workpiece supporting assembly being adapted to position a top portion of said front, rear, and intermediate board means in a workpiece supporting plane, a length of said intermediate board means being at least about $4\frac{3}{4}$ feet, whereby a sheet of $4'\times 8'$ material is able to be placed upon top surfaces of said board means, and a lengthwise displacement component along a lengthwise axis of said workpiece supporting assembly from said front workpiece supporting frame means to said rear workpiece supporting frame means is able to be at least $4\frac{1}{2}$ feet so that said sheet of material is able to remain supported by said board means while being sawed.

12. A workpiece supporting assembly as recited in claim 11, wherein said board securing means is adapted to extend vertically from said horizontally extending line for only a portion of a thickness of each for securing said board means in a manner to leave an upper portion of said board means unobstructed so that a saw is able to cut with safe clearance through an upper portion of said board means at various locations.

13. A method of supporting a workpiece to be sawed, said method comprising:
 a. providing a board supporting assembly having a longitudinal axis and a transverse axis and comprising: a front board supporting means for supporting a front board means at a front end of said assembly; a rear board supporting means for supporting a rear board means at a rear end of said assembly; and a connecting board supporting means adapted to support a connecting board means and connected pivotally at a front end thereof to said front board supporting means in a manner that said front board supporting means is adapted to be rotated about a front pivot axis to a collapsed position, said connecting board means pivotally connected, at a rear end thereof to said rear board supporting means in a manner that said rear board supporting means is adapted to be rotated about a rear pivot axis to a collapsed position;
 b. positioning said board supporting assembly in an operating position, wherein said front board supporting means supports said front board means along a length of said front board supporting means, said connecting board supporting means supports said connecting board means along a length of said connecting board supporting means, and said rear board supporting means supports said rear board means along a length of said rear board supporting means, said board supporting assembly and said board means together constituting a workpiece supporting assembly, said board supporting assembly being adapted to position upper portions of said front, connecting, and rear board means substantially within a workpiece supporting plane, said connecting board supporting means having a sufficient length to enable a component along said longitudinal axis of a displacement between said front board means and said rear board means to exceed 55% of a length of said workpiece;

c. positioning said workpiece supporting assembly in a manner that said longitudinal displacement component exceeds 55% of said length of said workpiece; and d. positioning said workpiece upon said workpiece supporting plane, whereby said workpiece is able to be cut into a front portion and a rear portion and said front and rear portions are able to remain supported.

14. The method of supporting a workpiece to be sawed as recited in claim 13, wherein in a normal operating position said workpiece supporting assembly defines a Z shape, said front and rear workpiece supporting means extending substantially to first and second opposed sides of said connecting workpiece supporting means.

15. The method as recited in claim 13, wherein an overall length of said workpiece supporting assembly in a collapsed position is sufficiently small to enable said workpiece supporting assembly to be placed within the load carrying portion of a pickup truck.

16. The method as recited in claim 15, wherein said connecting board supporting means is connected detachably to a platform means which extends horizontally from a first side of said connecting board supporting means, and a saw means that is connected atop said platform means in a manner that strips of wood are able to be sawed by said saw means while said strips are supported at selected locations atop said connecting board means and said rear board means.

17. The method as recited in claim 13, wherein said upper portions of said board means are kept unobstructed whereby a saw means which a person is using to saw said workpiece is able to cut with safe clearance through said upper portions at various locations.

18. The method as recited in claim 17, wherein said connecting board supporting means is connected detachably to a platform means which extends horizontally from a first side of said connecting board supporting means, and a saw means that is connected atop said platform means in a manner that strips of wood are able to be sawed by said saw means while said strip are supported at selected locations atop said connecting board means and said rear board means.

19. The method as recited in claim 18, wherein a an extending portion of said rear board means extends from said rear pivot axis to a location on said first side of said connecting board supporting means, whereby said strips are able to be supported upon said extending portion; wherein said saw means is positioned on said platform means in a manner that said strip when being sawed is positioned obliquely relative to said connecting board means; wherein said front board supporting means has a length which is sufficient to enable said front board supporting means to be collapsed to said collapsed position of said front board supporting means while said platform means is attached in place to said connecting board supporting means.

20. The method as recited in claim 13, wherein said front board means and said rear board means and ends of said connecting board means define board joint locations whereby short boards may be placed upon the board joint locations and may be supported while being sawed.

21. The method as recited in claim 20, wherein an overall length of said workpiece supporting assembly in a collapsed position is sufficiently small to enable said workpiece supporting assembly to be placed within the load carrying portion of a pickup truck.

* * * * *